(No Model.) 2 Sheets—Sheet 1.
W. G. CUMMINS.
HORSE DETACHER.
No. 267,331. Patented Nov. 14, 1882.
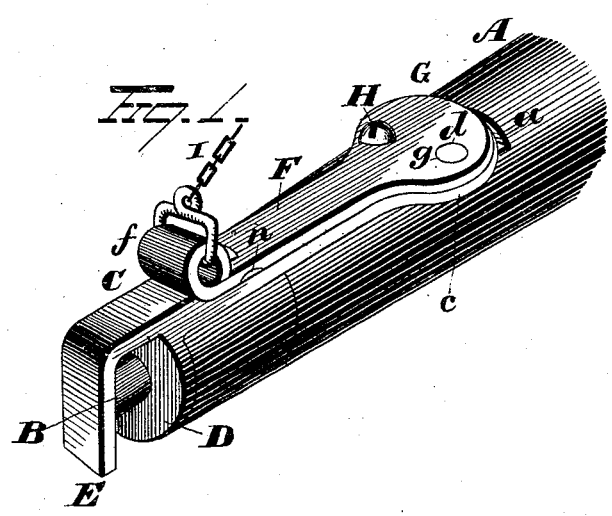
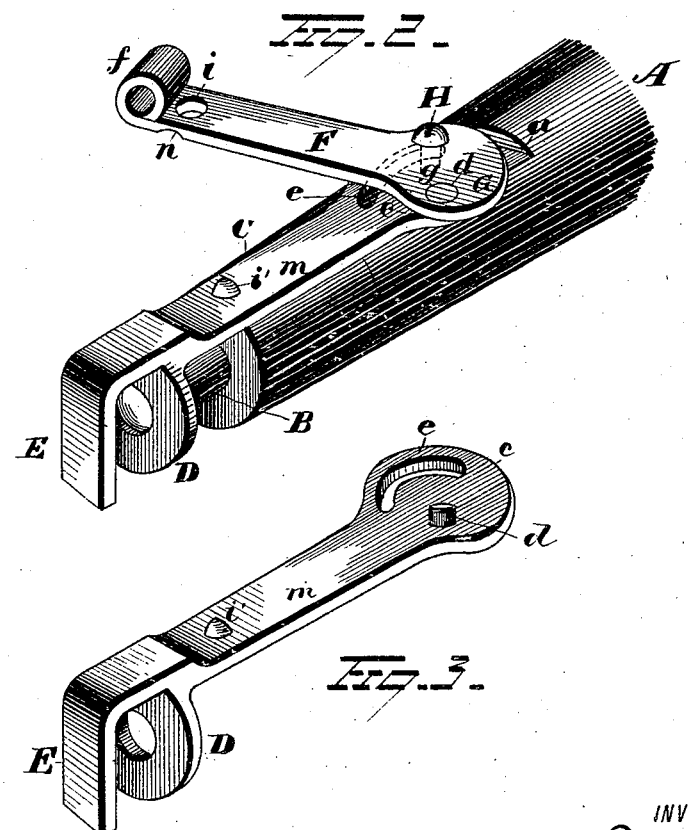
WITNESSES
E. I. Nottingham
Geo. Cook
INVENTOR
Wm. G. Cummins
By H. A. Seymour
Attorney (No Model.) 2 Sheets—Sheet 2.
W. G. CUMMINS.
HORSE DETACHER.
No. 267,331. Patented Nov. 14, 1882.
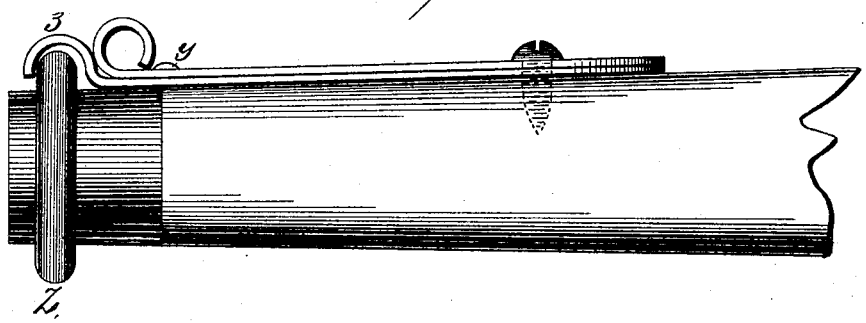
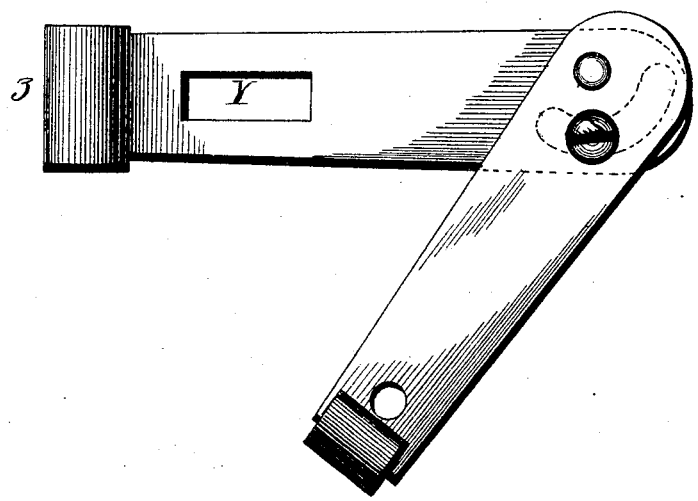
WITNESSES
O. L. Nottingham
Geo. Cook.
INVENTOR
Wm G. Cummins
By H. A. Symmons
Attorney
N. PETERS, Photo-Lithographer, Washington, D. C.

UNITED STATES PATENT OFFICE.

WILLIAM G. CUMMINS, OF McMINNVILLE, TENNESSEE.

HORSE-DETACHER.

SPECIFICATION forming part of Letters Patent No. 267,331, dated November 14, 1882.

Application filed April 12, 1882. (No model.)

*To all whom it may concern:*

Be it known that I, WM. G. CUMMINS, of McMinnville, in the county of Warren and State of Tennessee, have invented certain new and useful Improvements in Horse-Detachers; and I do hereby declare the following to be a full, clear, and exact description of the invention, such as will enable others skilled in the art to which it pertains to make and use the same.

My invention relates to an improvement in horse-detachers for vehicles, the object being to provide a device of this character which will be simple and inexpensive in construction, effective and reliable in operation, and durable in use.

The invention consists in the improved construction and combinations of parts hereinafter described, and pointed out in the claims.

In the drawings, Figure 1 is a perspective view of one end of a single-tree provided with my improvement, the parts being in a locked position. Fig. 2 is a similar view, showing the parts in their extended or detaching position. Fig. 3 represents a detached view of the detaching slide-bar. Figs. 4 and 5 represent a modification.

A represents the end of a single-tree provided with the usual pin, B, to receive the end of trace. The upper side of the single-tree is slightly recessed or cut away, as shown at $a$, to receive a slide-bar, C. The latter is provided at its outer end with a depending collar or perforated bracket, D, which receives the pin B, and is adapted to slide thereon. The outer end of the slide-bar C is bent downward to form a guard, E, which latter, when the parts are in locked position, as shown in Fig. 1, will bear against the outer end of the pin B to prevent the detachment of the trace. The inner end of the slide-bar C is formed with a circular enlargement, $c$, one side of which is provided with a stud-pivot, $d$, while the other side is formed with a curved slot, $e$.

F represents the latch-lever, provided at its inner end with a circular enlargement, G, corresponding to the enlarged inner end of the slide-bar C. One side of the end G of the lever is provided with a perforation, $g$, to fit over the stud $d$ of the slide-bar. A screw-pivot, H, passes through the opposite side of the inner end of the lever and through the curved slot $e$ of the slide-bar. This pivot H serves to secure both the slide-bar and the lever to the single-tree, and it also serves as the fulcrum of the latch-lever, which latter, when drawn back, forces the slide outward to detach the trace. The outer end of the lever F is turned back upon itself to form an eye or loop, $f$, to receive the end of a cord or chain, I, the opposite end of the latter being arranged within easy reach of the driver. A perforation, $i$, is formed in the lever F, near the outer end thereof, to engage a stud or catch, $i'$, of the slide-bar. The latter is beveled, as shown at $m$, to adapt it to receive the outer end of the latch-lever, the said lever being recessed slightly to form a cam-surface, $n$, to adapt the lever to be easily forced over the stud $i'$ of the slide-bar.

The device as thus constructed is adapted to be controlled by the driver of the vehicle, and it will be apparent that by drawing back the latch by means of the operating-cord the slide-bar will be forced out and the traces instantly detached.

The improvement is applicable to all kinds of vehicles, and either to single or double trees. In its use with buggies and other light vehicles, I prefer to arrange the device on top of the single-tree, while with wagons I arrange the detaching devices on the rear side of the single-tree. The guard E of the slide-bar serves to hold the trace in position upon the pin of the single-tree when the parts are in locked position.

The modification shown in Figs. 5 and 6 is adapted for use with wagons where a chain and a ring are used instead of the usual trace. In these figures the device is secured to the rear side of the single-tree. The slide-bar is curved at its outer end, $z$, to engage the ring Z, and is provided near said outer end with an elongated slot, Y, through which a round-headed screw, $y$, passes to secure the outer end of the slide-bar to the single-tree, the head of the screw serving as a catch for the latch-lever. The operation of this modified construction is the same as that of the other form of the device before described.

Many slight changes in the details of construction may be resorted to without departing from the spirit of my invention. Hence I do not limit myself to the precise construction shown and described, but reserve to myself the right to make such alterations in form and construction as may properly fall within the scope of my invention.

Having fully described my invention, what I claim as new, and desire to secure by Letters Patent, is—

1. The combination, with a single-tree and its pin, of a slide-bar provided with trace shipping and retaining devices, and a curved slot and a latch-lever pivoted eccentrically to said slide-bar and to the single-tree, and adapted to slide said bar, substantially as set forth.

2. The combination, with a single-tree and its pin, of a slide-bar provided with a trace shipper and guard, and a latch-lever pivotally connected to said slide-bar and to the single-tree, the pivot of said lever being adapted to pass through a curved slot in the slide-bar, and said slide-bar and lever being adapted to be locked together by a slot-and-pin engagement, substantially as set forth.

3. The combination, with a single-tree and its pin, of a slide-bar provided at its outer end with a perforated bracket and a guard, and a latch-lever eccentrically pivoted to said slide-bar and to the single-tree, said slide-bar having a curved slot through which the pivot of the latch-lever passes, substantially as set forth.

4. The combination, with the end of a single-tree and its pin, of a slide-bar provided at its outer end with a perforated shipper adapted to slide on said pin to detach the trace, a guard-flange adapted to bear against the outer end of said pin, and a stud or projection to receive a latch-lever, and a latch-lever, eccentrically pivoted to the inner end of said slide-bar and to the single-tree, and adapted to engage at its outer end with the stud of the slide-bar, the pivot of said lever passing through a curved slot in the slide-bar, whereby a sliding movement is imparted to said bar when the lever is drawn back, substantially as set forth.

5. The combination, with a single-tree and its pin, of a slide-bar provided with the perforated bracket to receive said pin, the bent end or guard, the beveled bearing-surface, curved slot, and locking-stud, and a latch-lever pivotally connected to said slide-bar and secured to the single-tree by a screw-pivot passing through the curved slot of the slide-bar, the outer end of said lever being provided with an eye to receive a cord or chain and a perforation to engage the locking-stud of the slide-bar, and with a cam-surface to adapt said lever to be forced over the stud of the slide-bar, substantially as set forth.

In testimony whereof I have signed this specification in the presence of two subscribing witnesses.

WILLIAM G. CUMMINS.

Witnesses:
JUBAL H. CUMMINS,
A. W. BRIGHT.